Patented Apr. 29, 1924.

1,491,916

UNITED STATES PATENT OFFICE.

MATTHEW D. MANN, JR., OF ROSELLE, AND ROBERT B. LEBO, OF ELIZABETH, NEW JERSEY, ASSIGNORS TO SETH B. HUNT, TRUSTEE, OF MOUNT KISCO, NEW YORK.

PURIFYING AND DEODORIZING ISOPROPYL ALCOHOL.

No Drawing. Application filed September 8, 1921. Serial No. 499,235.

*To all whom it may concern:*

Be it known that we, MATTHEW D. MANN, Jr., and ROBERT B. LEBO, citizens of the United States, residing at Roselle and Elizabeth, respectively, in the county of Union and State of New Jersey, have invented a new and useful Improvement in Purifying and Deodorizing Isopropyl Alcohol, of which the following is a specification.

The present invention relates to the purification and deodorizing of isopropyl alcohol and will be fully understood from the following description thereof.

Isopropyl alcohol, particularly when produced from hydrocarbon gases containing olefins such as the gases of oil refineries in which oil cracking operations are carried out, has a persistent pungent foreign odor. The cause of this odor is not definitely known, but is believed to be due to minute proportions of sulfur compounds, of unknown and obscure character.

In accordance with the present invention the deodorization and purification of such isopropyl alcohol may be accomplished in the following manner.

The isopropyl alcohol is subjected to the action of an active chlorine containing material, such as sodium hypochlorite, bleaching powder or the like, and at the same time is subjected to the action of an active oxygen carrier, such as manganese dioxid, potassium dichromate, potassium of sodium permanganate or the like. Additional alkaline material, such as caustic soda or sodium carbonate may likewise be added, if desired. After treatment of the alcohol with the active halogen containing material, the purified alcohol is recovered, suitably by distillation.

The following examples illustrate the procedure which may be used in carrying out the present invention.

Example No. 1.

To 1000 gallons of alcohol are added 200 gallons of water in which 20 pounds of bleach containing about 30% available chlorine, and also 40 pounds of potassium dichromate. 100 pounds of sodium hydroxid, dissolved in 10 to 15 gallons of water, may be added to the mixture. The alcohol is distilled off and is found to be substantially free from odor.

Example No. 2.

To 730 gallons of alcohol are added 25 pounds of bleach dissolved in 100 gallons of water. 25 pounds of manganese dioxid is agitated with the mixture. The alcohol is then distilled off.

The proportion of available chlorine employed may vary between fairly wide limits although remaining small relative to the proportion of alcohol treated. From 0.1 to 2.5% of available chlorine may be employed. The proportion of oxygen carrier may also be varied, for example, to yield from 0.1 to 2.5% of available oxygen.

We claim:

1. The method of purifying and deodorizing isopropyl alcohol derived from hydrocarbon gases containing olefins which comprises treating the alcohol with an active halogen material and with an oxygen carrier.

2. The method of purifying and deodorizing isopropyl alcohol derived from hydrocarbon gases containing olefins which comprises treating the alcohol with an active halogen material in the presence of an oxygen carrier.

3. The method of purifying and deodorizing isopropyl alcohol derived from hydrocarbon gases containing olefins which comprises admixing with the alcohol bleach and an oxygen carrier.

4. The method of purifying and deodorizing isopropyl alcohol derived from hydrocarbon gases containing olefins which comprises adding to the alcohol bleach and manganese dioxid.

5. The method of purifying and deodorizing isopropyl alcohol derived from hydrocarbon gases containing olefins which comprises adding to the alcohol bleaching powder and manganese dioxid and distilling off the alcohol.

6. The method of purifying and deodorizing isopropyl alcohol derived from hydrocarbon gases containing olefins which comprises adding to the alcohol bleach and an oxygen carrier in the proportions 25 pounds of bleaching powder dissolved in 100 gallons of water and 25 pounds of manganese dioxid to 730 gallons of alcohol, and distilling off the alcohol.

MATTHEW D. MANN, JR.
ROBERT B. LEBO.